(12) United States Patent
Zhang

(10) Patent No.: US 9,948,434 B2
(45) Date of Patent: Apr. 17, 2018

(54) METHOD FOR BIT ERROR RATE DETECTION, AND NETWORK DEVICE

(71) Applicant: Huawei Technologies Co., Ltd., Shenzhen (CN)

(72) Inventor: Li Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 14/990,617

(22) Filed: Jan. 7, 2016

(65) Prior Publication Data

US 2016/0119089 A1  Apr. 28, 2016

Related U.S. Application Data

(63) Continuation of application No. PCT/CN2013/078997, filed on Jul. 8, 2013.

(51) Int. Cl.
*H04L 1/20* (2006.01)
*H04L 12/26* (2006.01)
(Continued)

(52) U.S. Cl.
CPC ............... *H04L 1/203* (2013.01); *H04L 1/00* (2013.01); *H04L 12/6418* (2013.01);
(Continued)

(58) Field of Classification Search
None
See application file for complete search history.

(56) References Cited

U.S. PATENT DOCUMENTS

| | | | |
|---|---|---|---|
| 2002/0147947 A1 | 10/2002 | Mayweather et al. | |
| 2003/0091001 A1* | 5/2003 | Watanabe | H04L 5/1446 370/236 |

(Continued)

FOREIGN PATENT DOCUMENTS

| | | |
|---|---|---|
| CN | 101562531 A | 10/2009 |
| CN | 102035718 A | 4/2011 |
| EP | 2493102 A1 | 8/2012 |

OTHER PUBLICATIONS

Braden et al., "Resource ReSerVation Protocol (RSVP); Version 1 Functional Specification," Network Working Group, Request for Comments: 2205, IETF Trust, Reston, Virginia (Sep. 1997).

(Continued)

*Primary Examiner* — Chi H Pham
*Assistant Examiner* — Soon-Dong D Hyun
(74) *Attorney, Agent, or Firm* — Conley Rose, P.C.

(57) ABSTRACT

This application provides a method for bit error rate detection, and a device. The method includes: sending, by a first device, a first notification packet to a second device, where the first notification packet is used to instruct the second device to perform bit error rate detection, the first device is an ingress node of a first LSP, and the second device is a downstream node; and receiving, a second notification packet, where the second notification packet carries a second bit error rate, the second bit error rate includes a first bit error rate of a first interface of the second device, and the first interface is an interface that receives an MPLS packet sent by the first device. By using the technical solutions of the present disclosure, the first device can perceive a bit error rate of the second device, thereby helping ensure reliability of MPLS packet transmission.

20 Claims, 6 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type (Type)          |         Length (Length)       |
+-+-+-+-+-+-+-+-+-+-+-+-+-+-+-+-+-+-+-+-+-+-+-+-+-+-+-+-+-+-+-+-+
|                  Bit error rate value (Bit Error Value)       |
+-+-+-+-+-+-+-+-+-+-+-+-+-+-+-+-+-+-+-+-+-+-+-+-+-+-+-+-+-+-+-+-+
```

(51) Int. Cl.
*H04L 12/723* (2013.01)
*H04L 1/00* (2006.01)
*H04L 12/64* (2006.01)
*H04L 12/701* (2013.01)

(52) U.S. Cl.
CPC .......... *H04L 43/0823* (2013.01); *H04L 43/16* (2013.01); *H04L 45/00* (2013.01); *H04L 45/50* (2013.01)

(56) References Cited

U.S. PATENT DOCUMENTS

| | | | |
|---|---|---|---|
| 2007/0070933 A1* | 3/2007 | Chan | H04W 92/12 370/328 |
| 2007/0274232 A1 | 11/2007 | Axelsson et al. | |
| 2012/0148234 A1* | 6/2012 | Bellagamba | H04J 14/0221 398/28 |
| 2013/0060966 A1* | 3/2013 | Moisiadis | H04W 40/246 709/250 |
| 2013/0121165 A1* | 5/2013 | Okazaki | H04L 1/0001 370/241.1 |
| 2014/0355453 A1* | 12/2014 | Zhang | B01D 19/0409 370/242 |
| 2015/0282226 A1* | 10/2015 | Fan | H04W 12/06 370/329 |

OTHER PUBLICATIONS

Awduche et al., "RSVP-TE: Extensions to RSVP for LSP Tunnels," Networks Working Group, Request for Comments: 3209, The Internet Society, Reston, Virginia (2001).

Farrel et al., "Encoding of Attributes for MPLS LSP Establishment using Resource Reservation Protocol Traffic Engineering (RSVP-TE)," Network Working Group, Request for Comments: 5420, IETF Trust, Reston, Virginia (Feb. 2009).

Bocci et al., "MPLS Generic Associated Channel," Network Working Group, Request for Comments 5586, pp. 1-19, IETF Trust, Reston, Virginia (Jun. 2009).

Huang et al., "Diagnostic tool-test for MPLS transport profile," MPLS Working Group, draft-flh-mpls-tp-oam-diagnositc-test-02, pp. 1-12, IETF Trust, Reston, Virginia (Nov. 30, 2010).

Ram et al., "SD detection and protection triggering in MPLS-TP," MPLS Working Group, draft-rkhd-mpls-tp-sd-03.txt, pp. 1-7, IETF Trust, Reston, Virginia (May 31, 2011).

Li et al., "RSVP-TE Extensions for Bit Error Rate (BER) Measurement," Network Working Group, draft-zhang-ccamp-rsvpte-ber-measure-00, pp. 1-6, IETF Trust, Reston, Virginia (Jul. 15, 2013).

"Bit error rate," Wikipedia, http://en.wikipedia.org/wiki/Bit_error_rate, Mar. 14, 2013.

* cited by examiner

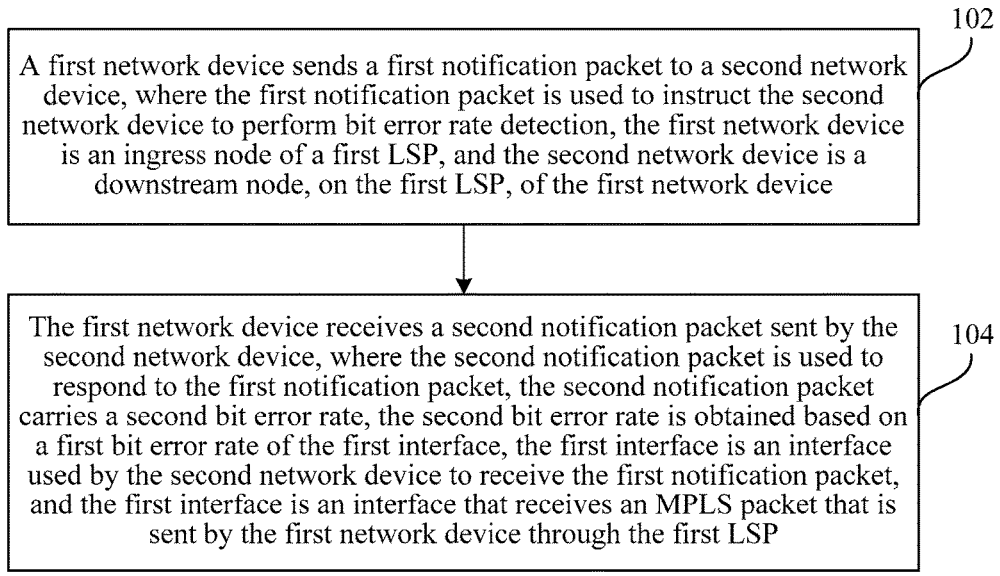

```
                       102
A first network device sends a first notification packet to a second network
  device, where the first notification packet is used to instruct the second
network device to perform bit error rate detection, the first network device
    is an ingress node of a first LSP, and the second network device is a
         downstream node, on the first LSP, of the first network device

↓

The first network device receives a second notification packet sent by the    104
    second network device, where the second notification packet is used to
      respond to the first notification packet, the second notification packet
 carries a second bit error rate, the second bit error rate is obtained based on
  a first bit error rate of the first interface, the first interface is an interface
  used by the second network device to receive the first notification packet,
  and the first interface is an interface that receives an MPLS packet that is
                 sent by the first network device through the first LSP
```

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (Type)        |           Length (Length)      |
+-+-+-+-+-+-+-+-+-+-+-+-+-+-+-+-+-+-+-+-+-+-+-+-+-+-+-+-+-+-+-+-+
|                 Bit error rate value (Bit Error Value)         |
+-+-+-+-+-+-+-+-+-+-+-+-+-+-+-+-+-+-+-+-+-+-+-+-+-+-+-+-+-+-+-+-+
```

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              IPv4 error node address (IPv4 Error Node Address)  |
+-+-+-+-+-+-+-+-+-+-+-+-+-+-+-+-+-+-+-+-+-+-+-+-+-+-+-+-+-+-+-+-+
|   Flag (Flags)   |  Error code (Error Code) | Error value (Error Value) |
+-+-+-+-+-+-+-+-+-+-+-+-+-+-+-+-+-+-+-+-+-+-+-+-+-+-+-+-+-+-+-+-+
```

FIG. 3

METHOD FOR BIT ERROR RATE DETECTION, AND NETWORK DEVICE

CROSS-REFERENCE TO RELATED APPLICATIONS

This application is a continuation of International Patent Application No. PCT/CN2013/078997, filed on Jul. 8, 2013, which is incorporated herein by reference in its entirety.

TECHNICAL FIELD

Embodiments of the present disclosure relate to the field of communications technologies, and in particular, to a method for bit error rate detection, and a network device.

BACKGROUND

A Bit Error Rate (BER) is an indicator used to measure accuracy of data transmission within a specified time. In an Internet Protocol (IP) Radio Access Network (RAN), a radio service has a specific requirement for a bit error rate. When the bit error rate exceeds a threshold, a base station considers that a radio service control layer is interrupted, and the base station disrupts a connection between the base station and a base station controller. As a result, an attached terminal device cannot access a mobile network, which greatly affects a mobile service. There are various types of methods for collecting statistics on a bit error rate. A Cyclic Redundancy Check (CRC) on an interface is a common method, and the CRC method is mainly used to collect statistics on a bit error rate of a packet in an ingress direction of an interface. In the conventional art, there is no technical solution that achieves perceiving of a bit error rate of a downstream node by an ingress node (Ingress Node) of a Label Switched Path (LSP), which does not help ensure reliability of Multiple protocol Label Switching (MPLS) packet transmission in an IP RAN solution.

SUMMARY

Embodiments of the present disclosure provide a method for bit error rate detection, and a network device, which are used to resolve a technical problem in the prior art that an ingress node of an LSP cannot perceive a bit error rate of a downstream node.

A first aspect provides a method for detecting a bit error rate, where the method includes:

sending, by a first network device, a first notification packet to a second network device, where the first notification packet is used to instruct the second network device to perform bit error rate detection, the first network device is an ingress node of a first LSP, and the second network device is a downstream node, on the first LSP, of the first network device; and receiving, by the first network device, a second notification packet sent by the second network device, where the second notification packet is used to respond to the first notification packet, the second notification packet carries a second bit error rate, the second bit error rate is obtained based on a first bit error rate of the first interface, the first interface is an interface used by the second network device to receive the first notification packet, and the first interface is an interface that receives an MPLS packet that is sent by the first network device through the first LSP.

In a first possible implementation manner of the first aspect, a standby LSP of the first LSP is a second LSP, and the method further includes:

when the first network device determines that the second bit error rate exceeds a first threshold, switching, by the first network device, the first LSP to a standby LSP, where the first threshold is a nonnegative number; and switching, by the first network device, the second LSP to an active LSP.

With reference to the first aspect or the first possible implementation manner of the first aspect, a second possible implementation manner of the first aspect is further provided, and in the second possible implementation manner of the first aspect, the second bit error rate is equal to the first bit error rate.

With reference to the first aspect or either of the foregoing possible implementation manners of the first aspect, a third possible implementation manner of the first aspect is further provided, and in the third possible implementation manner of the first aspect, the first notification packet is a Resource Reservation Protocol-Traffic Engineering (Resource Reservation Protocol-Traffic Engineering, RSVP-TE) path (Path) message, the Path message includes an LSP attribute object (LSP_ATTRIBUTES object), the LSP_ATTRIBUTES object includes a bit error rate request (Bit Error Rate Request, BER REQ) type length value (Type Length Value, TLV), the BER REQ TLV carries a second threshold, the second threshold is a nonnegative number, and the first bit error rate is greater than the second threshold.

A second aspect provides a method for bit error rate detection, where the method includes:

receiving, by a second network device, a first notification packet sent by a first network device, where the first notification packet is used to instruct the second network device to perform bit error rate detection, the first network device is an ingress node of a label switched path LSP, and the second network device is a downstream node, on the LSP, of the first network device;

performing, by the second network device, bit error rate detection on a first interface of the second network device, to obtain a first bit error rate of the first interface, where the first interface is an interface used by the second network device to receive the first notification packet, and the first interface is an interface that receives an MPLS packet that is sent by the first network device through the LSP; and sending, by the second network device, a second notification packet that carries a second bit error rate to the first network device, where the second bit error rate is obtained based on the first bit error rate.

In a first possible implementation manner of the second aspect, the second network device sends a third notification packet that carries the second bit error rate to a third network device, where the third network device is an egress node (Egress Node) of the LSP.

With reference to the second aspect or the first possible implementation manner of the second aspect, a second possible implementation manner of the second aspect is further provided, and after the receiving, by the second network device, the first notification packet, the method further includes:

establishing, by the second network device, a correspondence between the first interface and the LSP;

the sending, by the second network device, a second notification packet that carries a second bit error rate to the first network device includes:

determining, by the second network device, the LSP according to the first interface and the correspondence;

determining that the ingress node of the LSP is the first network device; and sending the second notification packet to the first network device.

With reference to the second aspect or either of the foregoing possible implementation manners of the second aspect, a third possible implementation manner of the second aspect is further provided, and in the third possible implementation manner of the second aspect, the second notification packet is an RSVP-TE path error (Path Error) message, the Path Error message includes a first error specification object (ERROR_SPEC objection), the first ERROR_SPEC objection includes an error code (Error code) and an error value (Error Value), the Error code is used to identify that the first ERROR_SPEC objection carries the second bit error rate, and the Error Value is used to carry the second bit error rate.

With reference to the first possible implementation manner of the second aspect, a fourth possible implementation manner of the second aspect is further provided, and in the fourth possible implementation manner of the second aspect, the third notification packet is an RSVP-TE resource reservation error (Resv Error) message, the Resv Error message includes a second ERROR_SPEC objection, the second ERROR_SPEC objection includes an Error code and an Error Value, the Error code is used to identify that the second ERROR_SPEC objection carries the second bit error rate, and the Error Value is used to carry the second bit error rate.

With reference to the second aspect or any one of the foregoing possible implementation manners of the second aspect, a fifth possible implementation manner of the second aspect is further provided, and in the fifth possible implementation manner of the second aspect, the second bit error rate is equal to the first bit error rate.

With reference to the second aspect or any one of the foregoing possible implementation manners of the second aspect, a sixth possible implementation manner of the second aspect is further provided, and in the sixth possible implementation manner of the second aspect, the method further includes:

forwarding, by the second network device, the first notification packet to a downstream node of the second network device along the LSP.

With reference to the sixth possible implementation manner of the second aspect, a seventh possible implementation manner of the second aspect is further provided, and in the seventh possible implementation manner of the second aspect, the method further includes:

receiving, by the second network device, a fourth notification packet sent by a fourth network device, where the fourth notification packet carries a third bit error rate, the third bit error rate is a bit error rate of a second interface of the fourth network device, the fourth network device is a downstream node, on the LSP, of the second network device, the fourth notification packet is sent to the second network device by the fourth network device after the fourth network device receives the first notification packet, the second interface is an interface that receives the first notification packet, the second interface is an interface that receives an MPLS packet that is sent by using the LSP by the first network device, and the second bit error rate is a sum of the first bit error rate and the third bit error rate.

A third aspect provides a first network device, where the first network device includes:

a sending unit, configured to send a first notification packet to a second network device, where the first notification packet is used to instruct the second network device to perform bit error rate detection, the first network device is an ingress node of a first label switched path LSP, and the second network device is a downstream node, on the first LSP, of the first network device; and a receiving unit, configured to receive a second notification packet sent by the second network device, where the second notification packet is used to respond to the first notification packet, the second notification packet carries a second bit error rate, the second bit error rate is obtained based on a first bit error rate of the first interface, the first interface is an interface used by the second network device to receive the first notification packet, and the first interface is an interface that receives an MPLS packet that is sent by the first network device through the first LSP.

In a first possible implementation manner of the third aspect, a standby LSP of the first LSP is a second LSP, and the first network device further includes:

a determining unit, configured to determine whether the second bit error rate exceeds a first threshold, where the first threshold is a nonnegative number; and a processing unit, configured to: when the determining unit determines that the second bit error rate exceeds the first threshold, switch the first LSP to a standby LSP, and switch the second LSP to an active LSP.

With reference to the first aspect or the first possible implementation manner of the first aspect, a second possible implementation manner of the first aspect is further provided, and in the second possible implementation manner of the third aspect, the second bit error rate is equal to the first bit error rate.

With reference to the first aspect or the first possible implementation manner of the first aspect, a third possible implementation manner of the first aspect is further provided, and in the third possible implementation manner of the third aspect, the first notification packet is an RSVP-TE Path message, the Path message includes an LSP_ATTRIBUTES object, the LSP_ATTRIBUTES object includes a BER REQ TLV, the BER REQ TLV carries a second threshold, the second threshold is a nonnegative number, and the first bit error rate is greater than the second threshold.

A fourth aspect provides a second network device, where the second network device includes:

a receiving unit, configured to receive a first notification packet sent by a first network device, where the first notification packet is used to instruct the second network device to perform bit error rate detection, the first network device is an ingress node of an LSP, and the second network device is a downstream node, on the LSP, of the first network device;

a detecting unit, configured to perform bit error rate detection on a first interface of the second network device, to obtain a first bit error rate of the first interface, where the first interface is an interface used by the second network device to receive the first notification packet, and the first interface is an interface that receives an MPLS packet that is sent by the first network device through the LSP; and a sending unit, configured to send a second notification packet that carries a second bit error rate to the first network device, where the second bit error rate is obtained based on the first bit error rate.

In a first possible implementation manner of the fourth aspect, the sending unit is further configured to send a third notification packet that carries the second bit error rate to a third network device, where the third network device is an egress node of the LSP.

With reference to the fourth aspect or the first possible implementation manner of the fourth aspect, a second possible implementation manner of the fourth aspect is further provided, and in the second possible implementation manner of the fourth aspect, the second network device further includes:

an establishing unit, configured to: after the receiving unit receives the first notification packet, establish a correspondence between the first interface and the LSP; and correspondingly, the sending unit determines the LSP according to the first interface and the correspondence, determines that the ingress node of the LSP is the first network device, and sends the second notification packet to the first network device.

With reference to the fourth aspect or either of the foregoing possible implementation manners of the fourth aspect, a third possible implementation manner of the fourth aspect is further provided, and in the third possible implementation manner of the fourth aspect, the second notification packet is an RSVP-TE Path Error message, the Path Error message includes a first ERROR_SPEC objection, the first ERROR_SPEC objection includes an Error code and an Error Value, the Error code is used to identify that the first ERROR_SPEC objection carries the second bit error rate, and the Error Value is used to carry the second bit error rate.

With reference to the first possible implementation manner of the fourth aspect, a fourth possible implementation manner of the fourth aspect is further provided, and in the fourth possible implementation manner of the fourth aspect, the third notification packet is an RSVP-TE Resv Error message, the Resv Error message includes a second ERROR_SPEC objection, the second ERROR_SPEC objection includes an Error code and an Error Value, the Error code is used to identify that the second ERROR_SPEC objection carries the second bit error rate, and the Error Value is used to carry the second bit error rate.

With reference to the fourth aspect or any one of the foregoing possible implementation manners of the fourth aspect, a fifth possible implementation manner of the fourth aspect is further provided, and in the fifth possible implementation manner of the fourth aspect, the second bit error rate is equal to the first bit error rate.

With reference to the fourth aspect or any one of the foregoing possible implementation manners of the fourth aspect, a sixth possible implementation manner of the fourth aspect is further provided, and in the sixth possible implementation manner of the fourth aspect, the sending unit is further configured to forward the first notification packet to a downstream node of the second network device along the LSP.

With reference to the sixth possible implementation manner of the fourth aspect, a seventh possible implementation manner of the fourth aspect is further provided, and in the seventh possible implementation manner of the fourth aspect, the receiving unit is further configured to receive a fourth notification packet sent by a fourth network device, where the fourth notification packet carries a third bit error rate, the third bit error rate is a bit error rate of a second interface of the fourth network device, the fourth network device is a downstream node, on the LSP, of the second network device, the fourth notification packet is sent to the second network device by the fourth network device after the fourth network device receives the first notification packet, the second interface is an interface that receives the first notification packet, the second interface is an interface that receives an MPLS packet that is sent by using the LSP by the first network device, and the second bit error rate is a sum of the first bit error rate and the third bit error rate.

In the technical solutions provided in the embodiments of the present disclosure, a first network device sends a first notification packet to a second network device, where the first notification packet is used to instruct the second network device to perform bit error rate detection; the first network device sends the first notification packet to the second network device, so that the second network device does not need to manually enable a function of bit error rate detection, and configuration of the second network device is simplified; and the first network device receives a second notification packet sent by the second network device, and the first network device can perceive a bit error rate of the second network device, thereby helping ensure reliability of MPLS packet transmission in an IP RAN solution.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

FIG. 1 is a schematic flowchart of a method for bit error rate detection according to an embodiment of the present disclosure;

FIG. 2 is a schematic diagram of a format of a BER REQ TLV according to an embodiment of the present disclosure;

FIG. 3 is a schematic diagram of a format of an IPv4 ERROR_SPEC object according to an embodiment of the present disclosure;

DESCRIPTION OF EMBODIMENTS

Figure 4:
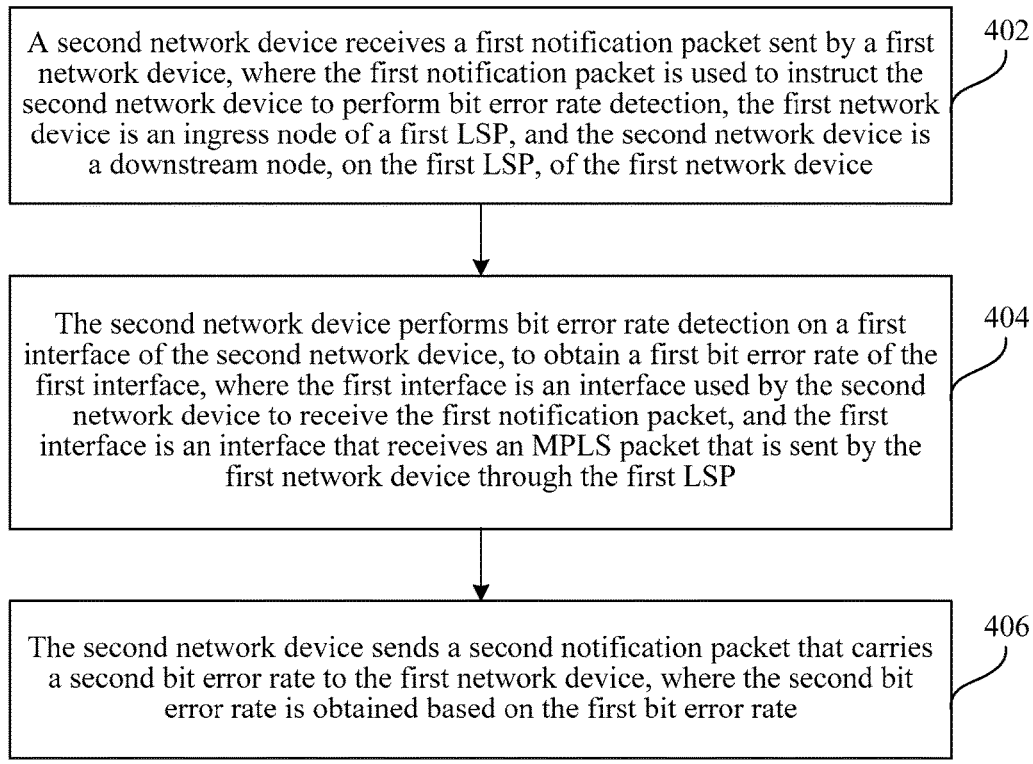
FIG. 4 is a schematic flowchart of a method for bit error rate detection according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by persons of ordinary skill in the art based on the embodiments of the present disclosure without creative efforts shall fall within the protection scope of the present disclosure.

Referring to FIG. 1, an embodiment of the present disclosure provides a method for bit error rate detection. The method includes:

102: A first network device sends a first notification packet to a second network device, where the first notification packet is used to instruct the second network device to perform bit error rate detection, the first network device is an ingress node of a first LSP, and the second network device is a downstream node, on the first LSP, of the first network device.

104: The first network device receives a second notification packet sent by the second network device, where the second notification packet is used to respond to the first notification packet, the second notification packet carries a second bit error rate, the second bit error rate is obtained based on a first bit error rate of the first interface, the first interface is an interface used by the second network device to receive the first notification packet, and the first interface is an interface that receives an MPLS packet that is sent by the first network device through the first LSP.

Optionally, a standby LSP of the first LSP is a second LSP, and the method further includes:

when the first network device determines that the second bit error rate exceeds a first threshold, switching, by the first network device, the first LSP to a standby LSP, where the first threshold is a nonnegative number; and switching, by the first network device, the second LSP to an active LSP.

Optionally, the first threshold is configured in advance on the first network device. The first threshold is a maximum bit error rate, acceptable to the first network device, on the first LSP. When the first network device determines that the second bit error rate exceeds the first threshold, the first network device considers that a fault has occurred on the first LSP, and the first LSP cannot be used to continue to carry a service packet of a user any longer.

Optionally, the second LSP is configured in advance on the first network device as a standby LSP of the first LSP. In a normal case, the first LSP carries a service packet that is of a user and is from the first network device to the second network device. When the first network device determines that a bit error rate on the first LSP exceeds the first threshold, the first network device switches the first LSP to a standby LSP and switches the second LSP to an active LSP. In this way, the service packet originally carried by the first LSP will be carried by using the second LSP, thereby ensuring that a user service is not interrupted, and improving reliability of user service transmission.

Optionally, the first bit error rate of the first interface is obtained by performing CRC on a packet received by the first interface.

Optionally, the second bit error rate is equal to the first bit error rate.

Optionally, the second network device is an egress node of the first LSP, or the second network device is an intermediate node of the first LSP.

Optionally, the first LSP is a unidirectional TE LSP (Unidirectional TE LSP), or the first LSP is an associated bidirectional TE LSP (Associated Bidirectional TE LSP), or the first LSP is a co-routed bidirectional TE LSP (Co-routed Bidirectional TE LSP).

Optionally, the first notification packet is an RSVP-TE Path message, the Path message includes an LSP_ATTRIBUTES object, the LSP_ATTRIBUTES object includes a BER REQ TLV, the BER REQ TLV carries a second threshold, the second threshold is a nonnegative number, and the first bit error rate is greater than the second threshold. Referring to FIG. 2, FIG. 2 is a schematic diagram of a format of the BER REQ TLV, where a type (Type) field is used to identify a type of the BER REQ TLV, and a value of the Type is assigned by the Internet Assigned Numbers Authority (The Internet Assigned Numbers Authority, IANA);

a length (Length) field is used to identify a length of a Bit Error Value field of the BER REQ TLV; and a bit error value (Bit Error Value) field is used to carry the second threshold.

When the second threshold is nonzero, the second network device detects the bit error rate of the first interface; and when the first bit error rate exceeds the second threshold, the second network device sends the second notification packet to the first network device.

When the second threshold is zero, the second network device no longer sends the second notification packet to the first network device.

Optionally, when the first network device does not need to perceive a bit error rate of the second network device any more, or when the first LSP is deleted, the first network device sends the first notification packet to the second network device, where the second threshold included in the first notification packet is zero.

Optionally, the second notification packet is an RSVP-TE Path Error message, the Path Error message includes a first ERROR_SPEC object, the first ERROR_SPEC objection includes an Error code and an Error Value, the Error code is used to identify that the first ERROR_SPEC objection carries the second bit error rate, and the Error Value is used to carry the second bit error rate. For definition of the first ERROR_SPEC object, reference may be made to the RFC2205 published by the Internet Engineering Task Force (Internet Engineering Task Force, IETF). The first ERROR_SPEC object is an Internet Protocol version 4 (Internet Protocol version 4, IPv4) ERROR_SPEC object or an Internet Protocol version 6 (Internet Protocol version 6, IPv6) ERROR_SPEC object. The IPv4 ERROR_SPEC object is used as an example. Referring to FIG. 3, FIG. 3 is a schematic diagram of a format of the IPv4 ERROR_SPEC object, where an error node IPv4 address (IPv4 Error Node Address) field is used to identify an IPv4 address of a node on which an error occurs, and is used to carry an address of the second network device in this embodiment of the present disclosure;

a flag (Flags) field is used to identify a state of the first LSP on the second network device;

an error code (Error Code) field is used to identify an error type, and a value of the Error Code is assigned by the IANA and is used to identify that the second notification packet carries the bit error rate of the second network device; and an error value (Error Value) field is used to carry the second bit error rate.

Optionally, the third notification packet is an RSVP-TE Resv Error message, the Resv Error message includes a second ERROR_SPEC object, the second ERROR_SPEC objection includes an Error code and an Error Value, the Error code is used to identify that the second ERROR_SPEC objection carries the second bit error rate, and the Error Value is used to carry the second bit error rate. For definition of the second ERROR_SPEC object, reference may be made to the RFC2205 published by IETF. The second ERROR_SPEC object is an IPv4 ERROR_SPEC object or an IPv6 ERROR_SPEC object. A format of the second ERROR_SPEC object is the same as that of the first ERROR_SPEC object, and is not described in detail herein again.

By using the technical solutions provided in this embodiment of the present disclosure, a first network device sends a first notification packet to a second network device, where the first notification packet is used to instruct the second network device to perform bit error rate detection; the first network device sends the first notification packet to the second network device, so that the second network device does not need to manually enable a function of bit error rate detection, and configuration of the second network device is simplified; and in particular, when the first network device has multiple downstream nodes, as long as the first network device sends the first notification packet to downstream network devices once along the first LSP, the multiple downstream nodes can start bit error rate detection, thereby simplifying network configuration and enhancing network maintainability. The first network device receives a second notification packet sent by the second network device, and the first network device can dynamically perceive a situation of a bit error rate of the second network device; and when a second bit error rate exceeds a first threshold, active/standby LSP switching is performed, thereby helping ensure reliability of MPLS packet transmission in an IP RAN solution.

Referring to FIG. 4, an embodiment of the present disclosure provides a method for bit error rate detection. The method includes:

402: A second network device receives a first notification packet sent by a first network device, where the first notification packet is used to instruct the second network device to perform bit error rate detection, the first network device is an ingress node of a first LSP, and the second network device is a downstream node, on the first LSP, of the first network device.

404: The second network device performs bit error rate detection on a first interface of the second network device, to obtain a first bit error rate of the first interface, where the first interface is an interface used by the second network device to receive the first notification packet, and the first interface is an interface that receives an MPLS packet that is sent by the first network device through the first LSP.

406: The second network device sends a second notification packet that carries a second bit error rate to the first network device, where the second bit error rate is obtained based on the first bit error rate.

Optionally, the first bit error rate of the first interface is obtained by performing CRC on a packet received by the first interface.

Optionally, the second network device is an egress node of the first LSP, or the second network device is an intermediate node of the first LSP.

Optionally, the first LSP is a Unidirectional TE LSP, or the first LSP is an Associated Bidirectional TE LSP, or the first LSP is a Co-routed Bidirectional TE LSP.

Optionally, a standby LSP of the first LSP is a second LSP, and the method further includes:

when the first network device determines that the second bit error rate exceeds a first threshold, switching, by the first network device, the first LSP to a standby LSP; and switching, by the first network device, the second LSP to an active LSP.

Optionally, the first threshold is configured in advance on the first network device. The first threshold is a nonnegative number, and the first threshold is a maximum bit error rate, acceptable to the first network device, on the first LSP. When the first network device determines that the second bit error rate exceeds the first threshold, the first network device considers that a fault has occurred on the first LSP, and the first LSP cannot be used to continue to carry a service packet of a user any longer.

Optionally, the second LSP is configured in advance on the first network device as a standby LSP of the first LSP. In a normal case, the first LSP carries a service packet that is of a user and is from the first network device to the second network device. When the first network device determines that a bit error rate on the first LSP exceeds the first threshold, the first network device switches the first LSP to a standby LSP and switches the second LSP to an active LSP. In this way, the service packet originally carried by the first LSP continues to be carried by using the second LSP, thereby improving reliability of user service transmission.

Optionally, after the first network device switches the first LSP to a standby LSP and switches the second LSP to an active LSP, when the second network device detects that the bit error rate of the first interface is zero, the second bit error rate in the second notification packet that is sent by the second network device to the first network device is zero. In this way, when the first network device determines that the second bit error rate is zero and considers that the service packet of the user can continue to be carried through the first LSP, the first network device may switch the second LSP to a standby LSP, and switch the first LSP to an active LSP.

Optionally, the first notification packet is an RSVP-TE Path message, the Path message includes an LSP_ATTRIBUTES object, the LSP_ATTRIBUTES object includes a BER REQ TLV, the BER REQ TLV carries a second threshold, the second threshold is a nonnegative number, and the first bit error rate is greater than the second threshold. The BER REQ TLV has been described in detail in the embodiment in FIG. 1, and is not described in detail herein again.

Optionally, the second notification packet is an RSVP-TE Path Error message, the Path Error message includes a first ERROR_SPEC object, the first ERROR_SPEC objection includes an Error code and an Error Value, the Error code is used to identify that the first ERROR_SPEC objection carries the second bit error rate, and the Error Value is used to carry the second bit error rate. The first ERROR_SPEC object may be an IPv4 ERROR_SPEC object or an IPv6 ERROR_SPEC object. The first ERROR_SPEC object has been described in detail in the embodiment in FIG. 1, and is not described in detail herein again.

Optionally, the third notification packet is an RSVP-TE Resv Error message, the Resv Error message includes a second ERROR_SPEC object, the second ERROR_SPEC objection includes an Error code and an Error Value, the Error code is used to identify that the second ERROR_SPEC objection carries the second bit error rate, and the Error Value is used to carry the second bit error rate. A format of the second ERROR_SPEC object is the same as that of the first ERROR_SPEC object, and is not described in detail herein again.

Optionally, after the receiving, by the second network device, the first notification packet, the method further includes:

establishing, by the second network device, a correspondence between the first interface and the first LSP, where the sending, by the second network device, a second notification packet that carries a second bit error rate to the first network device includes:

determining, by the second network device, the first LSP according to the first interface and the correspondence;

determining that the ingress node of the first LSP is the first network device; and sending the second notification packet to the first network device. In this way, when multiple LSPs all pass through the first interface, by establishing the correspondence, the second network device can accurately determine an ingress node, which needs to perceive the bit error rate of the first interface, of an LSP, so that the second network device is prevented from sending the second notification packet to ingress nodes of the multiple LSPs that pass through the first interface, thereby avoiding excessive network bandwidth occupation.

Optionally, the second network device sends a third notification packet that carries the second bit error rate to a third network device, where the third network device is an egress node of the first LSP. When the first LSP is a Co-routed Bidirectional TE LSP, after the third network device receives the third notification packet, when the third network device determines that the second bit error rate exceeds a third threshold, the third network device switches a reverse LSP corresponding to the first LSP to a standby LSP, and switches a standby LSP of the reverse LSP to an active LSP. The third threshold is configured in advance on the third network device. The third threshold is a nonnegative number, and the third threshold is a maximum bit error rate, acceptable to the third network device, on the reverse LSP. When the bit error rate of the reverse LSP exceeds the third threshold, the third network device considers that a fault has occurred on the reverse LSP, and the reverse LSP cannot be used to continue to carry a service packet of a user any longer. By using the foregoing technical solutions, normal transmission of user service traffic carried by the reverse LSP is ensured, and reliability of user service transmission is improved.

Optionally, the second network device forwards the first notification packet to a downstream node of the second network device along the first LSP, so that after receiving the first notification packet, the downstream node of the second network device performs bit error rate detection.

Figure 5:
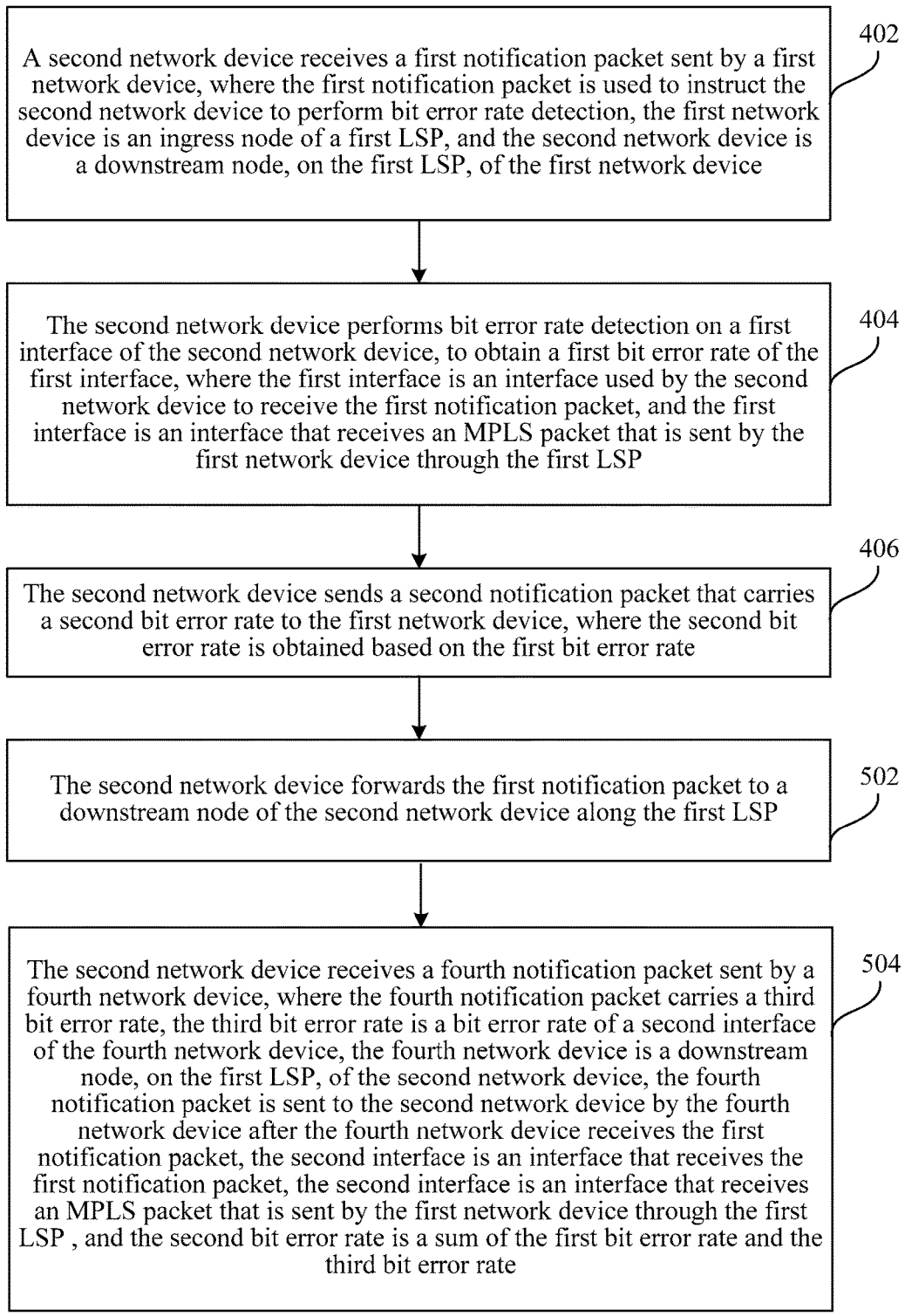
FIG. 5 is a schematic flowchart of an implementation manner of the method for bit error rate detection shown in FIG. 4.

Optionally, referring to FIG. 5, the method further includes:

502: The second network device forwards the first notification packet to a downstream node of the second network device along the first LSP.

504: The second network device receives a fourth notification packet sent by a fourth network device, where the fourth notification packet carries a third bit error rate, the third bit error rate is a bit error rate of a second interface of the fourth network device, the fourth network device is a downstream node, on the first LSP, of the second network device, the fourth notification packet is sent to the second network device by the fourth network device after the fourth network device receives the first notification packet, the second interface is an interface that receives the first notification packet, the second interface is an interface that receives an MPLS packet that is sent by the first network device through the first LSP, and the second bit error rate is a sum of the first bit error rate and the third bit error rate. After receiving the first notification packet, the fourth network device performs bit error rate detection on the second interface, to obtain the third bit error rate. When the second network device receives the fourth notification packet sent by the fourth network device, the second network device adds the third bit error rate and the first bit error rate together to obtain the second bit error rate, and then sends the second notification packet that includes the second bit error rate to the first network device. In this way, the first network device can obtain the bit error rate on the first LSP more accurately; moreover, because the second network device sends the third bit error rate to the first network device by using the second notification packet, the second network device does not need to forward the third notification packet to the first network device again, thereby avoiding excessive network bandwidth occupation.

Optionally, the third bit error rate of the second interface is obtained by performing CRC on a packet received by the second interface.

By using the technical solutions provided in this embodiment of the present disclosure, after receiving a first notification packet sent by the first network device, a second network device performs bit error rate detection, so that the second network device does not need to manually enable a function of bit error rate detection, and configuration of the second network device is simplified; and in particular, when the first network device has multiple downstream nodes, as long as the first network device sends the first notification packet to downstream network devices once, the downstream nodes of the first network device can start bit error rate detection, thereby simplifying network configuration and enhancing network maintainability. Moreover, the second network device sends a second notification packet to the first network device, so that the first network device can dynamically perceive a situation of a bit error rate of the second network device; and when a second bit error rate exceeds a first threshold, active/standby LSP switching is performed, thereby helping ensure reliability of MPLS packet transmission in an IP RAN solution.

Figure 6:
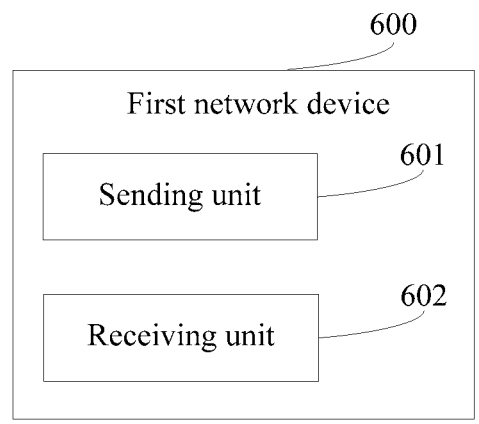
FIG. 6 is a schematic structural diagram of a first network device according to an embodiment of the present disclosure.

Referring to FIG. 6, an embodiment of the present disclosure further provides a first network device 600. The first network device 600 includes:

a sending unit 601, configured to send a first notification packet to a second network device, where the first notification packet is used to instruct the second network device to perform bit error rate detection, the first network device is an ingress node of a first LSP, and the second network device is a downstream node, on the first LSP, of the first network device; and a receiving unit 602, configured to receive a second notification packet sent by the second network device, where the second notification packet is used to respond to the first notification packet, the second notification packet carries a second bit error rate, the second bit error rate is obtained based on a first bit error rate of a first interface, the first interface is an interface used by the second network device to receive the first notification packet, and the first interface is an interface that receives an MPLS packet that is sent by the first network device 600 through the first LSP.

Figure 6A:
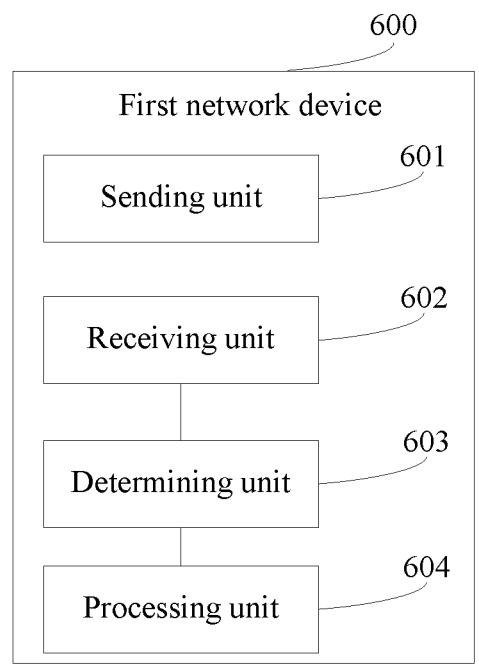
FIG. 6A is a schematic structural diagram of an implementation manner of the first network device shown in FIG. 6.

Optionally, a standby LSP of the first LSP is a second LSP, and referring to FIG. 6A, the first network device 600 further includes:

a determining unit 603, configured to determine whether the second bit error rate exceeds a first threshold, where the first threshold is a nonnegative number; and a processing unit 604, configured to: when the determining unit 603 determines that the second bit error rate exceeds the first threshold, switch the first LSP to a standby LSP, and switch the second LSP to an active LSP.

Optionally, the first threshold is a maximum bit error rate, acceptable to the first network device 600, on the first LSP. When the determining unit 603 determines that the second bit error rate exceeds the first threshold, the first network device considers that a fault has occurred on the first LSP, and the first LSP cannot be used to continue to carry a service packet of a user any longer.

Optionally, the second LSP is a standby LSP of the first LSP. In a normal case, the first LSP carries a service packet that is of a user and is from the first network device 600 to the second network device. When the determining unit 603 determines that a bit error rate of the first LSP exceeds the first threshold, the determining unit 603 switches the first LSP to a standby LSP and switches the second LSP to an active LSP. In this way, the service packet originally carried by the first LSP continues to be carried by using the second LSP, thereby ensuring that a user service is not interrupted, and improving reliability of user service transmission.

The first bit error rate of the first interface is obtained by performing CRC on a packet received by the first interface.

Optionally, the second bit error rate is equal to the first bit error rate.

Optionally, the second network device is an egress node of the first LSP, or the second network device is an intermediate node of the first LSP.

Optionally, the first LSP is a Unidirectional TE LSP, or the first LSP is Associated Bidirectional TE LSP, or the first LSP is a Co-routed Bidirectional TE LSP.

Optionally, the first notification packet is an RSVP-TE Path message, the Path message includes an LSP_ATTRIBUTES object, the LSP_ATTRIBUTES object includes a BER REQ TLV, the BER REQ TLV carries a second threshold, the second threshold is a nonnegative number, and the first bit error rate is greater than the second threshold. The BER REQ TLV has been described in detail in the embodiment in FIG. 1, and is not described in detail herein again.

Optionally, when the first network device 600 does not need to perceive a bit error rate of the second network device any more, or when the first LSP is deleted, the sending unit 601 sends the first notification packet to the second network device, where the second threshold included in the first notification packet is zero.

Optionally, the second notification packet is an RSVP-TE Path Error message, the Path Error message includes a first ERROR_SPEC object, the first ERROR_SPEC objection includes an Error code and an Error Value, the Error code is used to identify that the first ERROR_SPEC objection carries the second bit error rate, and the Error Value is used to carry the second bit error rate. The first ERROR_SPEC object may be an IPv4 ERROR_SPEC object or an IPv6 ERROR_SPEC object. The first ERROR_SPEC object has been described in detail in the embodiment in FIG. 1, and is not described in detail herein again.

Optionally, the third notification packet is an RSVP-TE Resv Error message, the Resv Error message includes a second ERROR_SPEC object, the second ERROR_SPEC objection includes an Error code and an Error Value, the Error code is used to identify that the second ERROR_SPEC objection carries the second bit error rate, and the Error Value is used to carry the second bit error rate. A format of the second ERROR_SPEC object is the same as that of the first ERROR_SPEC object, and is not described in detail herein again.

By using the technical solutions provided in this embodiment of the present disclosure, the first network device 600 sends a first notification packet to a second network device, where the first notification packet is used to instruct the second network device to perform bit error rate detection; the first network device 600 sends the first notification packet to the second network device, so that the second network device does not need to manually enable a function of bit error rate detection, and configuration of the second network device is simplified; and in particular, when the first network device has multiple downstream nodes, as long as the first network device 600 sends the first notification packet to downstream network devices along the first LSP once, the multiple downstream nodes can start bit error rate detection, thereby simplifying network configuration and enhancing network maintainability. The first network device 600 receives a second notification packet sent by the second network device, and the first network device can dynamically perceive a situation of a bit error rate of the second network device; and when the second bit error rate exceeds the first threshold, active/standby LSP switching is performed, thereby helping ensure reliability of MPLS packet transmission in an IP RAN solution.

Figure 7:
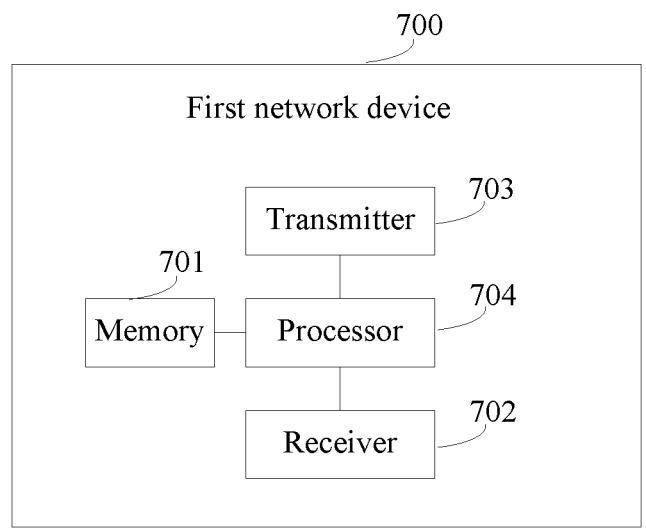
FIG. 7 is a schematic structural diagram of a first network device according to an embodiment of the present disclosure.

Referring to FIG. 7, an embodiment of the present disclosure further provides a first network device 700. The first network device 700 includes: a memory 701, a receiver 702, a transmitter 703, and a processor 704 that is connected to the memory 701, the receiver 702 and the transmitter 703 separately. The memory 701 is configured to store a group of program instructions, and the processor 704 is configured to invoke the program instructions stored in the memory 701 to perform the following operations:

triggering the transmitter 703 to send a first notification packet to a second network device, where the first notification packet is used to instruct the second network device to perform bit error rate detection, the first network device is an ingress node of a first LSP, and the second network device is a downstream node, on the first LSP, of the first network device; and triggering the receiver 702 to receive a second notification packet sent by the second network device, where the second notification packet is used to respond to the first notification packet, the second notification packet carries a second bit error rate, the second bit error rate is obtained based on a first bit error rate of a first interface, the first interface is an interface used by the second network device to receive the first notification packet, and the first interface is an interface that receives an MPLS packet that is sent by the first network device 700 through the first LSP.

Optionally, a standby LSP of the first LSP is a second LSP, and the processor 704 is further configured to invoke the program instructions stored in the memory 701 to perform the following operations:

determining whether the second bit error rate exceeds a first threshold, where the first threshold is a nonnegative number; and when determining that the second bit error rate exceeds the first threshold, switching the first LSP to a standby LSP, and switching the second LSP to an active LSP.

Optionally, the first threshold is a maximum bit error rate, acceptable to the first network device 700, on the first LSP. When the processor 704 determines that the second bit error rate exceeds the first threshold, the first network device considers that a fault has occurred on the first LSP, and the first LSP cannot be used to continue to carry a service packet of a user any longer.

Optionally, the second LSP is a standby LSP of the first LSP. In a normal case, the first LSP carries a service packet that is of a user and is from the first network device 700 to the second network device. When a bit error rate of the first LSP exceeds the first threshold, the first LSP is switched to a standby LSP and the second LSP is switched to an active LSP. In this way, the service packet originally carried by the first LSP continues to be carried by using the second LSP, thereby ensuring that a user service is not interrupted, and improving reliability of user service transmission.

The first bit error rate of the first interface is obtained by performing CRC on a packet received by the first interface.

Optionally, the first LSP is a Unidirectional TE LSP, or the first LSP is Associated Bidirectional TE LSP, or the first LSP is a Co-routed Bidirectional TE LSP.

Optionally, the first notification packet is an RSVP-TE Path message that includes an LSP_ATTRIBUTES object, the Path message includes an LSP_ATTRIBUTES object, the LSP_ATTRIBUTES object includes a BER REQ TLV, the BER REQ TLV carries a second threshold, the second threshold is a nonnegative number, and the first bit error rate is greater than the second threshold. The BER REQ TLV has been described in detail in the embodiment in FIG. 1, and is not described in detail herein again.

Optionally, when the first network device 700 does not need to perceive a bit error rate of the second network device any more, or when the first LSP is deleted, the transmitter 703 sends the first notification packet to the second network device, where the second threshold included in the first notification packet is zero.

Optionally, the second notification packet is an RSVP-TE Path Error message, the Path Error message includes a first ERROR_SPEC object, the first ERROR_SPEC objection includes an Error code and an Error Value, the Error code is used to identify that the first ERROR_SPEC objection carries the second bit error rate, and the Error Value is used to carry the second bit error rate. The first ERROR_SPEC object may be an IPv4 ERROR_SPEC object or an IPv6 ERROR_SPEC object. The first ERROR_SPEC object has been described in detail in the embodiment in FIG. 1, and is not described in detail herein again.

Optionally, the third notification packet is an RSVP-TE Resv Error message, the Resv Error message includes a second ERROR_SPEC object, the second ERROR_SPEC objection includes an Error code and an Error Value, the Error code is used to identify that the second ERROR_SPEC objection carries the second bit error rate, and the Error Value is used to carry the second bit error rate. A format of the second ERROR_SPEC object is the same as that of the first ERROR_SPEC object, and is not described in detail herein again.

Optionally, the first notification packet is an RSVP-TE Path message, the Path message includes an LSP_ATTRIBUTES object, the LSP_ATTRIBUTES object includes a BER REQ TLV, the BER REQ TLV carries a second threshold, the second threshold is a nonnegative number, and the first bit error rate is greater than the second threshold.

Optionally, the processor 704 may be a central processing unit (Central Processing Unit, CPU), the memory 701 may be an internal memory of a random access memory (Random Access Memory, RAM) type, the receiver 702 and the transmitter 703 may include a common physical interface, and the physical interface may be an Ethernet (Ethernet) interface or an asynchronous transfer mode (Asynchronous Transfer Mode, ATM) interface. The processor 704, the receiver 702, the transmitter 703 and the memory 701 may be integrated into one or more independent circuits or one or more pieces of hardware, for example, an application specific integrated circuit (Application Specific Integrated Circuit, ASIC).

By using the technical solutions provided in this embodiment of the present disclosure, a first network device 700 sends a first notification packet to a second network device, where the first notification packet is used to instruct the second network device to perform bit error rate detection; the first network device 700 sends the first notification packet to the second network device, so that the second network device does not need to manually enable a function of bit error rate detection, and configuration of the second network device is simplified; and in particular, when the first network device has multiple downstream nodes, as long as the first network device 700 sends the first notification packet to downstream network devices once along the first LSP, the multiple downstream nodes can start bit error rate detection, thereby simplifying network configuration and enhancing network maintainability. The first network device 700 receives a second notification packet sent by the second network device, and the first network device can dynamically perceive a situation of a bit error rate of the second network device; and when the second bit error rate exceeds the first threshold, active/standby LSP switching is performed, thereby helping ensure reliability of MPLS packet transmission in an IP RAN solution.

Figure 8:
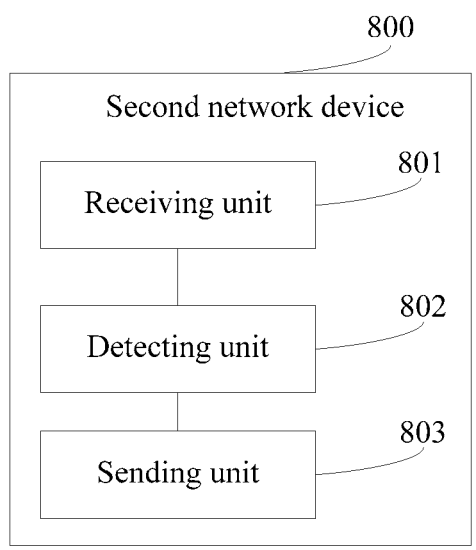
FIG. 8 is a schematic structural diagram of a second network device according to an embodiment of the present disclosure.

Referring to FIG. 8, an embodiment of the present disclosure further provides a second network device 800. The second network device 800 includes:

a receiving unit 801, configured to receive a first notification packet sent by a first network device, where the first notification packet is used to instruct the second network device 800 to perform bit error rate detection, the first network device is an ingress node of a first LSP, and the second network device 800 is a downstream node, on the first LSP, of the first network device;

a detecting unit 802, configured to perform bit error rate detection on a first interface of the second network device 800, to obtain a first bit error rate of the first interface of the second network device 800, where the first interface is an interface used by the second network device 800 to receive the first notification packet, and the first interface is an interface that receives an MPLS packet that is sent by the first network device through the first LSP; and a sending unit 803, configured to send a second notification packet that carries a second bit error rate to the first network device, where the second bit error rate is obtained based on the first bit error rate.

Optionally, the first bit error rate of the first interface is obtained by performing CRC on a packet received by the first interface.

Optionally, the second bit error rate is equal to the first bit error rate.

Optionally, the second network device 800 is an egress node of the first LSP, or the second network device 800 is an intermediate node of the first LSP.

Optionally, the first LSP is a Unidirectional TE LSP, or the first LSP is an Associated Bidirectional TE LSP, or the first LSP is a Co-routed Bidirectional TE LSP.

Optionally, when the first network device determines that the second bit error rate exceeds a first threshold, the first network device switches the first LSP to a standby LSP and switches the second LSP to an active LSP. The second LSP is a standby LSP of the first LSP. The first threshold is configured in advance on the first network device. The first threshold is a nonnegative number, and the first threshold is a maximum bit error rate, acceptable to the first network device, on the first LSP. When a bit error rate of the first LSP exceeds the first threshold, the first network device considers that a fault has occurred on the first LSP, and the first LSP cannot be used to continue to carry a service packet of a user any longer.

Optionally, the first notification packet is an RSVP-TE Path message, the Path message includes an LSP_ATTRIBUTES object, the LSP_ATTRIBUTES object includes a BER REQ TLV, the BER REQ TLV carries a second threshold, the second threshold is a nonnegative number, and the first bit error rate is greater than the second threshold. The BER REQ TLV has been described in detail in the embodiment in FIG. 1, and is not described in detail herein again.

Optionally, the second notification packet is an RSVP-TE Path Error message, the Path Error message includes a first ERROR_SPEC object, the first ERROR_SPEC objection includes an Error code and an Error Value, the Error code is used to identify that the first ERROR_SPEC objection carries the second bit error rate, and the Error Value is used to carry the second bit error rate. The first ERROR_SPEC object may be an IPv4 ERROR_SPEC object or an IPv6 ERROR_SPEC object. The first ERROR_SPEC object has been described in detail in the embodiment in FIG. 1, and is not described in detail herein again.

Optionally, the third notification packet is an RSVP-TE Resv Error message, the Resv Error message includes a second ERROR_SPEC object, the second ERROR_SPEC objection includes an Error code and an Error Value, the Error code is used to identify that the second ERROR_SPEC objection carries the second bit error rate, and the Error Value is used to carry the second bit error rate. A format of the second ERROR_SPEC object is the same as that of the first ERROR_SPEC object, and is not described in detail herein again.

Optionally, the second network device 800 further includes:

an establishing unit, configured to establish a correspondence between the first interface and the first LSP, where correspondingly, the sending unit 803 determines the first LSP according to the first interface and the correspondence, determines that the ingress node of the first LSP is the first network device, and sends the second notification packet to the first network device.

Optionally, the sending unit 803 is further configured to send a third notification packet that carries the second bit error rate to a third network device, where the third network device is an egress node of the first LSP. When the first LSP is a Co-routed Bidirectional TE LSP, after the third network device receives the third notification packet, when the third network device determines that the second bit error rate exceeds a third threshold, the third network device switches a reverse LSP corresponding to the first LSP to a standby LSP, and switches a standby LSP of the reverse LSP to an active LSP. The third threshold is configured in advance on the third network device. The third threshold is a nonnegative number, and the third threshold is a maximum bit error rate, acceptable to the third network device, of the reverse LSP. When the bit error rate of the reverse LSP exceeds the third threshold, the third network device considers that a fault has occurred on the reverse LSP, and the reverse LSP cannot be used to continue to carry a service packet of a user any longer. By using the foregoing technical solutions, normal transmission of user service traffic carried by the reverse LSP is ensured, and reliability of user service transmission is improved.

Optionally, the sending unit 803 is further configured to forward the first notification packet to a downstream node of the second network device along the first LSP.

Optionally, the receiving unit 801 is further configured to receive a fourth notification packet sent by a fourth network device, where the fourth notification packet carries a third bit error rate, the third bit error rate is a bit error rate of a second interface of the fourth network device, the fourth network device is a downstream node, on the first LSP, of the second network device 800, the fourth notification packet is sent to the second network device 800 by the fourth network device after the fourth network device receives the first notification packet, the second interface is an interface that receives the first notification packet, the second interface is an interface that receives an MPLS packet that is sent by the first network device through the first LSP, and the second bit error rate is a sum of the first bit error rate and the third bit error rate. When the second network device 800 receives the fourth notification packet sent by the fourth network device, the second network device 800 adds the third bit error rate and the first bit error rate together to obtain the second bit error rate, and then sends the second notification packet that includes the second bit error rate to the first network device. In this way, the first network device can obtain the bit error rate on the first LSP more accurately; moreover, because the second network device 800 sends the third bit error rate to the first network device by using the second notification packet, the second network device 800 does not need to send the third notification packet to the first network device again, thereby avoiding excessive network bandwidth occupation.

Optionally, the third bit error rate of the second interface is obtained by performing CRC on a packet received by the second interface.

By using the technical solutions provided in this embodiment of the present disclosure, after receiving a first notification packet sent by the a network device, a second network device 800 performs bit error rate detection, so that the second network device does not need to manually enable a function of bit error rate detection, and configuration of the second network device 800 is simplified; and in particular, when the first network device has multiple downstream nodes, as long as the first network device sends the first notification packet to downstream network devices once, the downstream nodes of the first network device can start bit error rate detection, thereby simplifying network configuration and enhancing network maintainability. Moreover, the second network device 800 sends a second notification packet to the first network device, so that the first network device can dynamically perceive a situation of a bit error rate of the second network device 800; and when a second bit error rate exceeds a first threshold, active/standby LSP switching is performed, thereby helping ensure reliability of MPLS packet transmission in an IP RAN solution.

Figure 9:
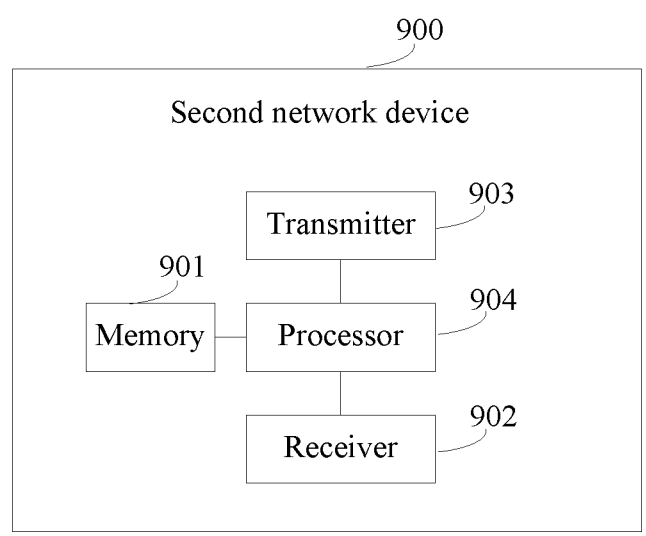
FIG. 9 is a schematic structural diagram of a second network device according to an embodiment of the present disclosure.

Referring to FIG. 9, an embodiment of the present disclosure further provides a second network device 900. The second network device 900 includes: a memory 901, a receiver 902, a transmitter 903, and a processor 904 that is connected to the memory 901, the receiver 902 and the transmitter 903 separately. The memory 901 is configured to store a group of program instructions, and the processor 904 is configured to invoke the program instructions stored in the memory 901 to perform the following operations:

triggering the receiver 902 to receive a first notification packet sent by a first network device, where the first notification packet is used to instruct the second network device 900 to perform bit error rate detection, the first network device is an ingress node of a first LSP, and the second network device 900 is a downstream node, on the first LSP, of the first network device;

performing bit error rate detection on a first interface of the second network device 900, to obtain a first bit error rate of the first interface of the second network device, where the first interface is an interface used by the receiver 902 to receive the first notification packet, and the first interface is an interface that receives an MPLS packet that is sent by the first network device through the first LSP; and triggering the transmitter 903 to send a second notification packet that carries a second bit error rate to the first network device, where the second bit error rate is obtained based on the first bit error rate.

Optionally, the first bit error rate of the first interface is obtained by performing CRC on a packet received by the first interface.

Optionally, the second bit error rate is equal to the first bit error rate.

Optionally, the second network device 900 is an egress node of the first LSP, or the second network device 900 is an intermediate node of the first LSP.

Optionally, the first LSP is a Unidirectional TE LSP, or the first LSP is an Associated Bidirectional TE LSP, or the first LSP is a Co-routed Bidirectional TE LSP.

Optionally, when the first network device determines that the second bit error rate exceeds a first threshold, the first network device switches the first LSP to a standby LSP and switches the second LSP to an active LSP. The second LSP is a standby LSP of the first LSP. The first threshold is configured in advance on the first network device. The first threshold is a nonnegative number, and the first threshold is a maximum bit error rate, acceptable to the first network device, on the first LSP. When a bit error rate of the first LSP exceeds the first threshold, the first network device considers that a fault has occurred on the first LSP, and the first LSP cannot be used to continue to carry a service packet of a user any longer.

Optionally, the first notification packet is an RSVP-TE Path message, the Path message includes an LSP_ATTRIBUTES object, the LSP_ATTRIBUTES object includes a BER REQ TLV, the BER REQ TLV carries a second threshold, the second threshold is a nonnegative number, and the first bit error rate is greater than the second threshold. The BER REQ TLV has been described in detail in the embodiment in FIG. 1, and is not described in detail herein again.

Optionally, the second notification packet is an RSVP-TE Path Error message, the Path Error message includes a first ERROR_SPEC object, the first ERROR_SPEC objection includes an Error code and an Error Value, the Error code is used to identify that the first ERROR_SPEC objection carries the second bit error rate, and the Error Value is used to carry the second bit error rate. The first ERROR_SPEC object may be an IPv4 ERROR_SPEC object or an IPv6 ERROR_SPEC object. The first ERROR_SPEC object has been described in detail in the embodiment in FIG. 1, and is not described in detail herein again.

Optionally, the third notification packet is an RSVP-TE Resv Error message, the Resv Error message includes a second ERROR_SPEC object, the second ERROR_SPEC objection includes an Error code and an Error Value, the Error code is used to identify that the second ERROR_SPEC objection carries the second bit error rate, and the Error Value is used to carry the second bit error rate. A format of the second ERROR_SPEC object is the same as that of the first ERROR_SPEC object, and is not described in detail herein again.

Optionally, the processor 904 is configured to invoke the program instructions stored in the memory 901 to perform the following operations:

establishing a correspondence between the first interface and the first LSP, where correspondingly, the transmitter 903 determines the first LSP according to the first interface and the correspondence, determines that the ingress node of the first LSP is the first network device, and sends the second notification packet to the first network device.

Optionally, the processor 904 is configured to invoke the program instructions stored in the memory 901 to perform the following operations:

triggering the transmitter 903 to send a third notification packet that carries the second bit error rate to a third network device, where the third network device is an egress node of the first LSP. When the first LSP is a Co-routed Bidirectional TE LSP, after the third network device receives the third notification packet, when the third network device determines that the second bit error rate exceeds a third threshold, the third network device switches a reverse LSP corresponding to the first LSP to a standby LSP, and switches a standby LSP of the reverse LSP to an active LSP. The third threshold is configured in advance on the third network device. The third threshold is a nonnegative number, and the third threshold is a maximum bit error rate, acceptable to the third network device, of the reverse LSP. When the bit error rate of the reverse LSP exceeds the third threshold, the third network device considers that a fault has occurred on the reverse LSP, and the reverse LSP cannot be used to continue to carry a service packet of a user any longer. By using the foregoing technical solutions, normal transmission of user service traffic carried by the reverse LSP is ensured, and reliability of user service transmission is improved.

Optionally, the processor 904 is configured to invoke the program instructions stored in the memory 901 to perform the following operations:

triggering the transmitter 903 to forward the first notification packet to a downstream node of the second network device along the first LSP.

Optionally, the processor 904 is configured to invoke the program instructions stored in the memory 901 to perform the following operations:

triggering the receiver 902 to receive a fourth notification packet sent by a fourth network device, where the fourth notification packet carries a third bit error rate, the third bit error rate is a bit error rate of a second interface of the fourth network device, the fourth network device is a downstream node, on the first LSP, of the second network device 900, the fourth notification packet is sent to the second network device 900 by the fourth network device after the fourth network device receives the first notification packet, the second interface is an interface that receives the first notification packet, the second interface is an interface that receives an MPLS packet that is sent by the first network device through the first LSP, and the second bit error rate is a sum of the first bit error rate and the third bit error rate. When the second network device 900 receives the fourth notification packet sent by the fourth network device, the second network device 900 adds the third bit error rate and the first bit error rate together to obtain the second bit error rate, and then sends the second notification packet that includes the second bit error rate to the first network device. In this way, the first network device can obtain the bit error rate on the first LSP more accurately; moreover, because the second network device 900 sends the third bit error rate to the first network device by using the second notification packet, the second network device 900 does not need to send the third notification packet to the first network device again, thereby avoiding excessive network bandwidth occupation.

Optionally, the third bit error rate of the second interface is obtained by performing CRC on a packet received by the second interface.

Optionally, the processor 904 may be a CPU, the memory 901 may be an internal memory of a RAM type, the receiver 902 and the transmitter 903 may include a common physical interface, and the physical interface may be an Ethernet interface or an ATM interface. The processor 904, the receiver 902, the transmitter 903 and the memory 901 may be integrated into one or more independent circuits or one or more pieces of hardware, for example, an ASIC.

By using the technical solutions provided in this embodiment of the present disclosure, after receiving a first notification packet sent by a first network device, a second network device 900 performs bit error rate detection, the second network device does not need to manually enable a function of bit error rate detection, and configuration of the second network device 900 is simplified; and in particular, when the first network device has multiple downstream nodes, as long as the first network device sends the first notification packet to downstream network devices once, the downstream nodes of the first network device can start bit error rate detection, thereby simplifying network configuration and enhancing network maintainability. Moreover, the second network device 900 sends a second notification packet to the first network device, so that the first network device can dynamically perceive a situation of a bit error rate of the second network device 900; and when a second bit error rate exceeds a first threshold, active/standby LSP switching is performed, thereby helping ensure reliability of MPLS packet transmission in an IP RAN solution.

In the embodiments of the present disclosure, "first" mentioned in the first network device, the first notification packet, the first LSP, the first interface, the first threshold, and the first bit error rate is merely used as a name for identification, and does not represent the first place in the sense of order. This rule is also applicable to "second", "third", and "fourth".

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium may be at least one of the following media: any medium that can store program code, such as a read-only memory (Read-Only Memory, ROM for short), a RAM, a magnetic disk, or an optical disc.

Finally, it should be noted that the foregoing embodiments are merely intended for exemplarily describing the technical solutions of the present disclosure rather than limiting the present disclosure. Although the present disclosure and beneficial effects of the present disclosure are described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solution to depart from the scope of the claims of the present disclosure.

What is claimed is:

1. A method for bit error rate detection implemented by a first network device, the method comprising:
    sending a first notification packet to a second network device, wherein the first notification packet is used to instruct the second network device to perform the bit error rate detection, the first network device is an ingress node of a first label switched path (LSP), and the second network device is a downstream node, on the first LSP, of the first network device;
    receiving a second notification packet sent by the second network device, wherein the second notification packet is used to respond to the first notification packet, the second notification packet carries a second bit error rate, the second bit error rate is obtained based on a first bit error rate of a first interface, the first interface is an interface used by the second network device to receive the first notification packet, and receives a Multiple protocol Label Switching (MPLS) packet that is sent by the first network device through the first LSP;
    switching the first LSP to a standby LSP of the first LSP when the first network device determines that the second bit error rate exceeds a first threshold, wherein the first threshold is a nonnegative number; and
    activating the standby LSP.

2. The method according to claim 1, wherein the second bit error rate is equal to the first bit error rate.

3. The method according to claim 1, wherein the first notification packet is a Resource Reservation Protocol-Traffic Engineering (RSVP-TE) path message comprising an LSP attribute (LSP_ATTRIBUTES) object, the LSP_ATTRIBUTES object comprises a bit error rate request type length value (BER REQ TLV), the BER REQ TLV carries a second threshold, the second threshold is a nonnegative number, and the first bit error rate is greater than the second threshold.

4. A method for bit error rate detection implemented by a second network device, the method comprising:
    receiving a first notification packet sent by a first network device, wherein the first notification packet is used to instruct the second network device to perform the bit error rate detection, the first network device is an ingress node of a label switched path (LSP), and the second network device is a downstream node, on the LSP, of the first network device;
    performing the bit error rate detection on a first interface of the second network device to obtain a first bit error rate of the first interface, wherein the first interface is an interface used by the second network device to receive the first notification packet, and receives a Multiple protocol Label Switching (MPLS) packet that is sent by the first network device through the LSP;
    sending a second notification packet that carries a second bit error rate to the first network device, wherein the second bit error rate is obtained based on the first bit error rate; and
    sending a third notification packet that carries the second bit error rate to a third network device,
    wherein the third network device is an egress node of the LSP.

5. The method according to claim 4, wherein the second notification packet is a Resource Reservation Protocol-Traffic Engineering (RSVP-TE) Path Error message comprising a first error specification (ERROR_SPEC) object, the first ERROR_SPEC object comprises an Error code and an Error Value, the Error code is used to identify that the first ERROR_SPEC object carries the second bit error rate, and the Error Value is used to carry the second bit error rate.

6. The method according to claim 4, wherein the third notification packet is an RSVP-TE resource reservation error (Resv Error) message, the Resv Error message comprises a second error specification (ERROR_SPEC) object, the second ERROR_SPEC object comprises an Error code and an Error Value, the Error code is used to identify that the second ERROR_SPEC object carries the second bit error rate, and the Error Value is used to carry the second bit error rate.

7. The method according to claim 4, wherein the second bit error rate is equal to the first bit error rate.

8. The method according to claim 4, further comprising forwarding the first notification packet to a downstream node of the second network device along the LSP.

9. The method according to claim 8, further comprising receiving a fourth notification packet sent by a fourth network device, wherein the fourth notification packet carries a third bit error rate, the third bit error rate is a bit error rate of a second interface of the fourth network device, the fourth network device is a downstream node, on the LSP, of the second network device, the fourth notification packet is sent to the second network device by the fourth network device after the fourth network device receives the first notification packet, the second interface is an interface that receives the first notification packet, and receives an MPLS packet that is sent by the first network device through the LSP, and the second bit error rate is a sum of the first bit error rate and the third bit error rate.

10. A method for bit error rate detection implemented by a second network device, the method comprising:
   receiving a first notification packet sent by a first network device, wherein the first notification packet is used to instruct the second network device to perform the bit error rate detection, the first network device is an ingress node of a label switched path (LSP), and the second network device is a downstream node, on the LSP, of the first network device;
   establishing a correspondence between the LSP and a first interface of the second network device;
   performing the bit error rate detection on the first interface to obtain a first bit error rate of the first interface, wherein the first interface is an interface used by the second network device to receive the first notification packet, and receives a Multiple protocol Label Switching (MPLS) packet that is sent by the first network device through the LSP;
   determining the LSP according to the first interface and the correspondence;
   determining that the ingress node of the LSP is the first network device; and
   sending a second notification packet to the first network device,
   wherein the second notification packet carries a second bit error rate to the first network device, and
   wherein the second bit error rate is obtained based on the first bit error rate.

11. A first network device comprising:
   a memory; and
   a processor coupled to the memory and configured to:
      send a first notification packet to a second network device, wherein the first notification packet is used to instruct the second network device to perform bit error rate detection, the first network device is an ingress node of a first label switched path (LSP), and the second network device is a downstream node, on the first LSP, of the first network device;
      receive a second notification packet sent by the second network device, wherein the second notification packet is used to respond to the first notification packet, the second notification packet carries a second bit error rate, the second bit error rate is obtained based on a first bit error rate of a first interface, the first interface is used by the second network device to receive the first notification packet, and the first interface receives a Multi-Protocol Label Switching (MPLS) packet that is sent by the first network device through the first LSP;
      switch the first LSP to a standby LSP of the first LSP when the first network device determines that the second bit error rate exceeds a first threshold, wherein the first threshold is a nonnegative number; and
      activate the standby LSP.

12. The first network device according to claim 11, wherein the second bit error rate is equal to the first bit error rate.

13. The first network device according to claim 11, wherein the first notification packet is a Resource Reservation Protocol-Traffic Engineering (RSVP-TE) Path message comprising an LSP attribute (LSP_ATTRIBUTES) object, the LSP_ATTRIBUTES object comprises a bit error rate request type length value (BER REQ UV), the BER REQ TLV carries a second threshold, the second threshold is a nonnegative number, and the first bit error rate is greater than the second threshold.

14. A second network device comprising:
   a memory; and
   a processor coupled to the memory and configured to:
      receive a first notification packet sent by a first network device, wherein the first notification packet is used to instruct the second network device to perform bit error rate detection, the first network device is an ingress node of a label switched path (LSP), and the second network device is a downstream node, on the LSP, of the first network device;
      perform the bit error rate detection on a first interface of the second network device to obtain a first bit error rate of the first interface, wherein the first interface is used by the second network device to receive the first notification packet, and the first interface receives a Multi-Protocol Label Switching (MPLS) packet that is sent by the first network device through the LSP;
      send a second notification packet that carries a second bit error rate to the first network device, wherein the second bit error rate is obtained based on the first bit error rate; and
      send a third notification packet that carries the second bit error rate to a third network device, wherein the third network device is an egress node of the LSP.

15. The second network device according to claim 14, wherein the second notification packet is a Resource Reservation Protocol-Traffic Engineering (RSVP-TE) Path Error message comprising a first error specification (ERROR_SPEC) object, the first ERROR_SPEC object comprises an Error code and an Error Value, the Error code is used to identify that the first ERROR_SPEC object carries the second bit error rate, and the Error Value is used to carry the second bit error rate.

16. The second network device according to claim 14, wherein the third notification packet is an RSVP-TE resource reservation error (Resv Error) message, the Resv Error message comprises a second error specification (ERROR_SPEC) object, the second ERROR_SPEC object comprises an Error code and an Error Value, the Error code is used to identify that the second ERROR_SPEC object carries the second bit error rate, and the Error Value is used to carry the second bit error rate.

17. The second network device according to claim 14, wherein the second hit error rate is equal to the first bit error rate.

18. The second network device according to claim 14, wherein the processor is further configured to forward the first notification packet to a downstream node of the second network device along the LSP.

19. The second network device according to claim 18, wherein the processor is further configured to receive a fourth notification packet sent by a fourth network device, wherein the fourth notification packet carries a third bit error rate, the third bit error rate is a bit error rate of a second interface of the fourth network device, the fourth network device is a downstream node, on the LSP, of the second network device, the fourth notification packet is sent to the second network device by the fourth network device after the fourth network device receives the first notification packet, the second interface is an interface that receives the first notification packet, and receives an MPLS packet that is sent by using the LSP by the first network device, and the second bit error rate is a sum of the first bit error rate and the third bit error rate.

20. A second network device comprising:
a memory; and
a processor coupled to the memory and configured to:
   receive a first notification packet sent by a first network device, wherein the first notification packet is used to instruct the second network device to perform bit error rate detection, the first network device is an ingress node of a label switched path (LSP), and the second network device is a downstream node, on the LSP, of the first network device;
   establish a correspondence between the LSP and a first interface of the second network device;
   perform the bit error rate detection on a first interface of the second network device to obtain a first bit error rate of the first interface, wherein the first interface is used by the second network device to receive the first notification packet and the first interface receives a Multi-Protocol Label Switching (MPLS) packet that is sent by the first network device through the LSP;
   determine the LSP according to the first interface and the correspondence;
   determine that the ingress node of the LSP is the first network device; and
   send a second notification packet to the first network device,
wherein the second notification packet carries a second bit error rate to the first network device, and
wherein the second bit error rate is obtained based on the first bit error rate.

* * * * *

UNITED STATES PATENT AND TRADEMARK OFFICE
CERTIFICATE OF CORRECTION

PATENT NO. : 9,948,434 B2
APPLICATION NO. : 14/990617
DATED : April 17, 2018
INVENTOR(S) : Li Zhang Page 1 of 1

It is certified that error appears in the above-identified patent and that said Letters Patent is hereby corrected as shown below:

In the Claims

Column 24; Line 18; Claim 13 should read:
request type length value (BER REQ TLV), the BER REQ Column 24; Line 66; Claim 17 should read:
wherein the second bit error rate is equal to the first bit error Signed and Sealed this
Fifth Day of June, 2018

Andrei Iancu
*Director of the United States Patent and Trademark Office*